(12) United States Patent
Dvorkin et al.

(10) Patent No.: US 8,170,799 B2
(45) Date of Patent: *May 1, 2012

(54) METHOD FOR DETERMINING IN-SITU RELATIONSHIPS BETWEEN PHYSICAL PROPERTIES OF A POROUS MEDIUM FROM A SAMPLE THEREOF

(75) Inventors: Jack Dvorkin, Redwood City, CA (US); Naum Derzhi, Sugarland, TX (US); Meghan Armbruster, Houston, TX (US); Qian Fang, Houston, TX (US); Zbigniew Wojcik, Houston, TX (US)

(73) Assignee: Ingrain, Inc., Houston, TX (US)

( * ) Notice: Subject to any disclaimer, the term of this patent is extended or adjusted under 35 U.S.C. 154(b) by 742 days.

This patent is subject to a terminal disclaimer.

(21) Appl. No.: 12/276,431

(22) Filed: Nov. 24, 2008

(65) Prior Publication Data

US 2010/0131204 A1 May 27, 2010

(51) Int. Cl.
*G01V 1/40* (2006.01)
*G01V 3/18* (2006.01)
*G01V 5/04* (2006.01)
*G01V 9/00* (2006.01)

(52) U.S. Cl. ............................................. 702/6; 702/11
(58) Field of Classification Search ................. 702/6, 11
See application file for complete search history.

(56) References Cited

U.S. PATENT DOCUMENTS

| | | | |
|---|---|---|---|
| 4,253,327 A * | 3/1981 | Wiley | 73/38 |
| 6,516,080 B1 * | 2/2003 | Nur | 382/109 |
| 7,120,541 B2 * | 10/2006 | Wang | 702/11 |
| 7,277,795 B2 * | 10/2007 | Boitnott | 702/6 |
| 7,286,939 B2 * | 10/2007 | Bachrach et al. | 702/14 |
| 2004/0046690 A1 * | 3/2004 | Reeves et al. | 342/175 |
| 2008/0025605 A1 * | 1/2008 | Suino | 382/173 |
| 2008/0037843 A1 * | 2/2008 | Fu et al. | 382/128 |
| 2009/0288880 A1 * | 11/2009 | Wojcik et al. | 175/50 |
| 2010/0128932 A1 * | 5/2010 | Dvorkin et al. | 382/109 |

OTHER PUBLICATIONS

Adams et al., "Seeded Region Growing", IEEE Transactions on Pattern Analysis and Machine Intelligence, vol. 16 No. 6, Jun. 1994, pp. 641-647.*

Sakellariou et al., "Developing a Virtual Materials Laboratory," Materials Today, vol. 10, No. 12, Dec. 2007, pp. 44-51.*

Bugani et al, "Investigating morpholgical changes in treated vs. untreated stone building materials by x-ray micro-CT", Anal Boiannal. Chem (2008); 391.1343-1350.

Felipuissi et al, Measuring Statistical Geometric Properties of Tomographic Images of Soils, IEEE Trnasactions on Instrumentation and Measurement v. 57, No. 11, 2008.

(Continued)

*Primary Examiner* — Michael Nghiem
(74) *Attorney, Agent, or Firm* — Kilyk & Bowersox, P.L.L.C.

(57) ABSTRACT

A method for determining in-situ relationships between physical properties of a porous medium from a sample thereof includes acquiring a three-dimensional image of the sample and segmenting the image into pixels representing pore space and pixels representing rock grain. A plurality of sub-volumes are selected from the segmented image, and a porosity is calculated for each of the sub-volumes. A digital simulation is conducted on each of the sub-volumes to obtain a selected physical property for the sub-volume. A relationship is determined between porosity and the selected physical property using relationship data comprising the calculated porosity and the simulated physical property for each of the sub-volumes. The method includes at least one of storing and displaying the relationship.

18 Claims, 10 Drawing Sheets

OTHER PUBLICATIONS

E. Galluci et al., "3D experimental investogation of the microstructure of cement pastes . . . ", Cement and Concrete Research 37 (2007) 360-368.

De Graef et al, "A sensititvity study for the visualization of bacterial weathering of concrete and stone . . . " Science of the Total Environment 341 (2005) 173-183.

Jones et al., "Chracterization of methane hydrate host sediments using synchrotron-computer miccrtotomography," J. Petr. Sci. and Eng. 56 (2007) 136-145.

Youssef et al., "High Resolution CT and Pore-Network Models to Assess Petrophysical Properties of Homogeneous and Heterogeneous Carbonates," Society of Petroleum Engineers/EAGE Reservoir Characterization and Simulation Conference, SPE No. 111427, Oct. 29, 2007, pp. 1-12 (12 pages).

Knackstedt et al., "Digital Core Laboratory: Properties of reservoir core derived from 3D images," Society of Petroleum Engineers Asia Pacific Conference on Integrated Modelling for Asset Management, SPE No. 87009, Mar. 29, 2004, pp. 1-14 (14 pages).

Adams et al., "Seeded Region Growing," IEEE Transactions on Pattern Analysis and Machine Intelligence, vol. 16, No. 6, Jun. 1994, pp. 641-647 (7 pages).

Sakellariou et al., "Developing a Virtual Materials Laboratory," Materials Today, vol. 10, No. 12, Dec. 2007, pp. 44-51 (8 pages).

Sandberg, "Methods for Image Segmentation in Cellular Tomography," Methods in Cell Biology, vol. 79, Jan. 1, 2007, pp. 769-798 (32 pages).

Oh et al., "Image Thresholding by Indicator Kriging," IEEE Transactions on Pattern Analysis and Machine Intelligence, vol. 21, No. 7, Jul. 1999, pp. 590-602 (13 pages).

International Search Report and Written Opinion of the International Searching Authority issued in corresponding International Patent Application No. PCT/US2009/065246 dated May 4, 2011 (12 pages).

\* cited by examiner

METHOD FOR DETERMINING IN-SITU RELATIONSHIPS BETWEEN PHYSICAL PROPERTIES OF A POROUS MEDIUM FROM A SAMPLE THEREOF

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of estimating material properties of porous media. More specifically, the invention relates to methods for estimating such properties using computer tomographic (CT) images of porous media such as subsurface rock formations.

2. Background Art

Estimating material properties such as effective elastic moduli, electrical resistivity and fluid transport properties of porous media, for example, mobility of hydrocarbon in subsurface rock formations, has substantial economic significance. Methods known in the art for identifying the existence of subsurface hydrocarbon reservoirs, including seismic surveying and well log analysis, need to be supplemented with reliable methods for estimating how fluids disposed in the pore spaces of the reservoir rock formations will flow over time in order to characterize the economic value of such reservoir rock formations.

One method known in the art for estimating fluid transport properties is described in U.S. Pat. No. 6,516,080 issued to Nur. The method described in the Nur patent includes preparing a "thin section" from a specimen of rock formation. The preparation typically includes filling the pore spaces with a dyed epoxy resin. A color micrograph of the section is digitized and converted to an n-ary index image, for example a binary index image. Statistical functions are derived from the two-dimensional image and such functions are used to generate three-dimensional representations of the rock formation. Boundaries can be unconditional or conditioned to the two-dimensional n-ary index image. Desired physical property values are estimated by performing numerical simulations on the three-dimensional representations. For example, permeability is estimated by using a Lattice-Boltzmann flow simulation. Typically, multiple, equiprobable three-dimensional representations are generated for each n-ary index image, and the multiple estimated physical property values are averaged to provide a result.

In performing the method described in the Nur patent, it is necessary to obtain samples of the rock formation and to prepare, as explained above, a section to digitize as a color image. Economic considerations make it desirable to obtain input to fluid transport analysis more quickly than can be obtained using prepared sections. Recently, devices for generating CT images of samples such as drill cuttings have become available. Such CT image generating devices (CT scanners) typically produce three-dimensional gray scale images of the samples analyzed in the scanner. Such gray scale images can be used essentially contemporaneously as drill cuttings are generated during the drilling of a wellbore through subsurface rock formations.

Using images of samples of rock formations, it is possible to obtain estimates of petrophysical parameters of the imaged rock sample, for example, porosity, permeability, shear and bulk moduli, and formation resistivity factor. The foregoing parameters are typically distributed within ranges in each rock formation, and there may be determinable relationships between such parameters such that determining one parameter value can enable determining one or more of the other parameters. One way to establish such relationship is to determine one or more rock physics transforms. A rock physics transform is a mathematical formula that relates one property of a rock formation to another. Such transforms can be based on an idealized mathematical model of rock, such as the differential effective medium that models rock as a solid with ideal-shape inclusions or the Hertz-Mindlin model that models rock as a composite made of perfect elastic spheres. Such transforms can also be based on a sufficient number of experimental data (e.g., well log measurements or laboratory measurements) using a statistically fit expression that approximates such data. An example of the latter is the Raymer transform between porosity $\phi$ and the compressional wave (P-wave) velocity of the rock ($V_p$). The transform is the expression $V_p=(1-\phi)^2 V_{ps}+\phi V_{pf}$, where $V_{ps}$ is the P-wave velocity in the mineral (matrix or solid) phase of the rock (e.g., quartz) and $V_{pf}$ is the P-wave velocity in the pore fluid (e.g., water). The elastic-wave velocity is directly related to the bulk K and shear G moduli: $V_p=\sqrt{(K+4G/3)/\rho}$, where $\rho$ is the bulk density of the rock. The foregoing moduli can be obtained by laboratory measurement and also by calculations made from an image of a rock sample. Another example of a statistically fit relationship is the relationship between the absolute permeability k and porosity $\phi$ called the Kozeny-Carman relation, represented by the expression $k=d^2\phi^3/[72\tau^2(1-\phi)^2]$, where d is the mean rock grain size and $\tau$ is the pore tortuosity (a number between 1 and 5). Yet another example is Humble's relationship between the electrical resistivity formation factor F and the porosity $\phi$, represented by $F=a/\phi^m$, where a and m are constants that are determined experimentally. As in the P-wave velocity example, the parameters that enter these two equations, one for permeability and the other for the formation factor, can be obtained by laboratory measurement and also by calculations based on an image of a rock sample. Instead of using the k and F equation examples above, one may conduct a large number of laboratory tests on samples that represent the formation under examination. Alternatively, such data can be obtained by digital calculations on a digitally imaged rock sample.

It is also known in the art that samples of rock formations withdrawn from wellbores, for example, can undergo changes in porosity and structure of the pore spaces as a result of moving the rock samples from subsurface conditions, where the rocks are subjected to large overburden and fluid pressure stresses, to the Earth's surface, where atmospheric temperatures and pressures exist. Such changes can affect the accuracy of fluid transport property estimation made from rock formation samples. There exists a need for fluid transport property estimation at subsurface conditions using rock samples analyzed at surface or near surface conditions.

SUMMARY OF THE INVENTION

In one aspect, the invention relates to a method for determining in-situ relationships between physical properties of a porous medium from a sample thereof which comprises acquiring a three-dimensional image of the sample and segmenting the image into pixels representing pore space and pixels representing mineral matrix. The method further includes selecting a plurality of sub-volumes from the segmented image and calculating a porosity for each of the sub-volumes. The method also includes conducting a simulation on each of the sub-volumes to obtain a selected physical property for the sub-volume. The method includes determining a relationship between porosity and the selected physical property using relationship data comprising the calculated porosity and the simulated physical property for each of the sub-volumes. The method further includes at least one of storing and displaying the relationship.

In another aspect, the invention relates to a method for determining in-situ relationships between physical properties of a porous medium from sample thereof which comprises acquiring a three-dimensional image of the sample and segmenting the image into pixels representing pore space and pixels representing mineral matrix. The method further includes producing one or more healed images from the segmented image by selectively removing artifacts from the segmented image. The method includes calculating a porosity for each of the healed images. The method further includes conducting a simulation on each of the healed images to obtain a selected physical property for the healed image. The method includes determining a relationship between porosity and the selected physical property using relationship data comprising the calculated porosity and the simulated physical property for each of the healed images. The method further includes at least one of storing and displaying the relationship.

Other aspects and advantages of the invention will be apparent from the following description and the appended claims.

DETAILED DESCRIPTION

The following description of the invention is made with reference to using drill cuttings obtained during the drilling of a wellbore through subsurface formations. It should be clearly understood that drill cuttings is only one example of types of samples of rock formation that may be used with the present invention. Any other source of a rock formation sample, e.g., whole cores, sidewall cores, and outcrop quarrying, may provide suitable samples for analysis using methods according to the invention. Consequently, the invention is not limited in scope to analysis of drill cuttings.

Figure 1:
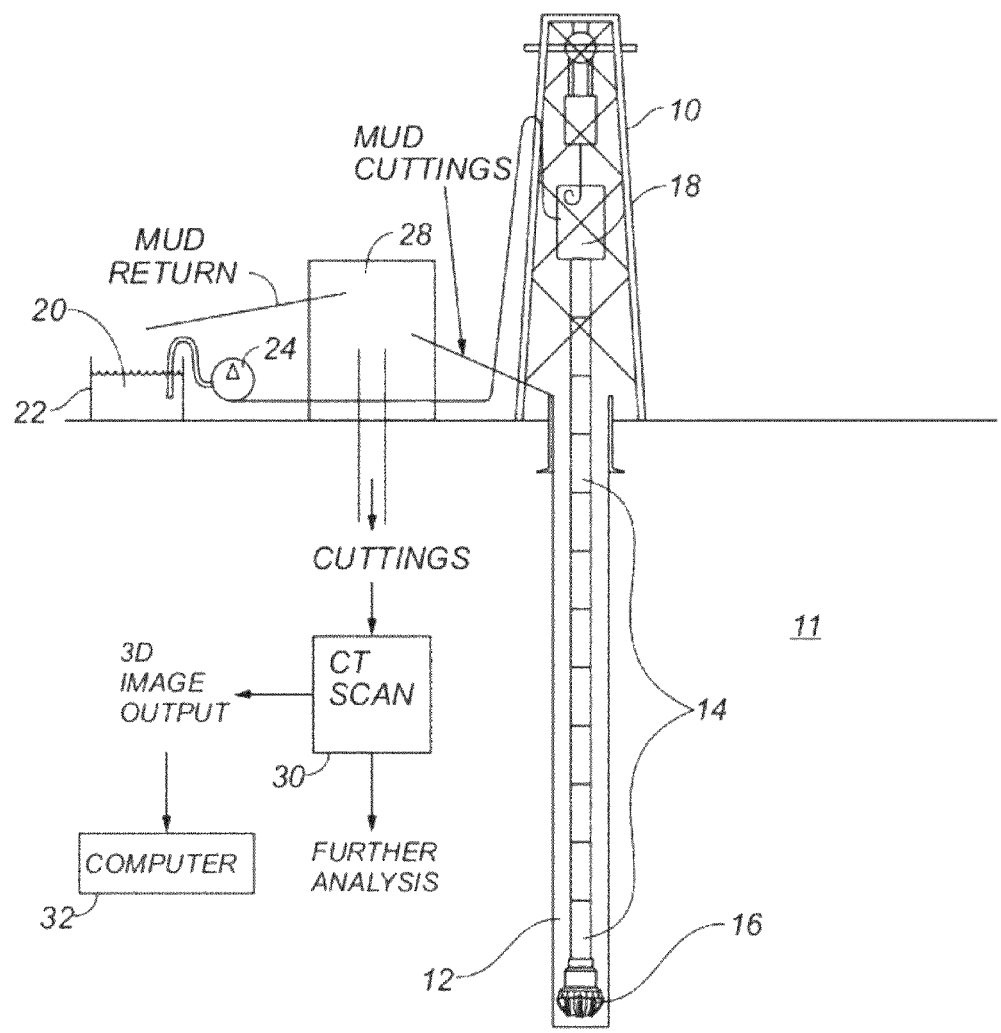
FIG. 1 shows an example of obtaining cuttings during drilling of a wellbore and analysis thereof during the drilling.

An example of drilling a wellbore to obtain samples of rock formations for evaluation by examples of a method according to the invention will be explained with reference to FIG. 1. A drilling unit or "rig" 10 is disposed at the Earth's surface. The rig 10 includes lifting equipment (not shown separately) for raising and lowering one of several types of device used to rotate a drill string 14. The device, shown at 18 in the present example may be a top drive, although the use of a top drive is not a limit on the scope of the invention. The drill string 14 is assembled by threadedly coupling segments of drill pipe end to end. A drill bit 16 is disposed at the lower end of the drill string 14 and cuts through subsurface rock formations 11 to form a wellbore 12. During the drilling of the wellbore 12, the rig 10 is operated to cause some of the axial load (weight) of the drill string 14 to be applied to the drill bit 16. The top drive 18 rotates the drill string 14 and the drill bit 16 at the lower end thereof. The combination of axial load and rotation causes the drill bit 16 to cut through the formations 11.

The rig 10 includes a tank or pit 22 having drilling fluid ("mud") 20 stored therein. A pump 24 lifts the mud 20 and discharges it through suitable flow lines 26 so that the mud 20 passes through an internal passage in the drill string 14, whereupon it is discharged through suitable orifices or courses in the drill bit 16. The discharged mud 20 cools and lubricates the drill bit 16 and lifts the cuttings generated by the bit 16 to the Earth's surface. The cuttings and mud thus lifted enter separation and cleaning devices, shown generally at 28 and including, for example, devices known as "degassers" and "shale shakers" to remove the cuttings and contamination from the mud 20. The mud after such cleaning is returned to the pit 22 for subsequent use in drilling the wellbore 12.

In the present example, the cuttings removed from the separation and cleaning device 28 may be transported to a computer tomographic ("CT") scanner 30, which may use x-rays for analysis of internal structure of the cuttings, for generation of three dimensional (3D) images of the cuttings. The images so generated may be in numerical form and their content will be further explained below. After CT scanning, the cuttings may be saved for further analysis or may be suitably discarded. An example of a suitable CT scanner for making images usable with methods according to the invention is sold under model designation MicroXCT Series 3D tomographic x-ray transmission microscope by Xradia, Inc., 5052 Commercial Circle, Concord, Calif. 94520.

In some examples, an analysis of the cuttings from the CT scan images may provide, substantially in real time during the drilling of the wellbore, an estimate of certain properties of the subsurface formations being drilled, for example fluid mobility of one or more constituent fluids in the pore spaces of the rock formations 11. In the present example, images generated by the CT scanner 30 may be transferred to a computer 32 having program instructions for carrying out image analysis and subsequent formation property modeling as described below.

It should also be understood that drill cuttings are only one type of rock sample that may be analyzed according to the invention. In other examples, the drill bit 16 may be an annular type configured to drill whole cores of the rock formations 11. In other examples, percussion sidewall core samples may be obtained during drilling or when the drill string 14 is withdrawn from the wellbore 12, such as for "wireline" well evaluation techniques. Accordingly, the scope of the invention is not limited to analysis of drill cuttings.

CT-scan imaging of a porous material sample (e.g., a sample of rock formation) is used in the invention to produce a numerical object that represents the material sample digitally in the computer 32 for subsequent numerical simulations of various physical processes, such as viscous fluid flow (for permeability estimation); stress loading (for the effective elastic moduli); electrical current flow (for resistivity); and pore size distribution for nuclear magnetic resonance relaxation time properties, including distribution of relaxation time. In some examples, such analysis can be performed while drilling operations are underway, substantially in real time.

The CT-scan image produced by the CT scanner 30 may be a 3D numerical object consisting of a plurality of 2D sections of the imaged sample. Each 2D section consists of a grid of values each corresponding to a small region of space defined within the plane of the grid. Each such small region of space is referred to as a "pixel" and has assigned thereto a number representing the image darkness (or for example the density of the material) determined by the CT scan procedure. The value ascribed to each pixel of the 2D sections is typically an integer that may vary between zero and 255 where 0 is, e.g., pure white, and 255 is pure black. Such integer is typically referred to as a "gray scale" value. 0 to 255 is associated with eight digital bits in a digital word representing the gray scale value in each pixel. Other gray scale ranges may be associated with longer or shorter digital words in other implementations, and the range of 0 to 255 is not intended to limit the scope of the invention. For the purpose of simulating a physical process using such a numerical object (the gray scale), however, the numerical object is preferably processed so that all the pixels allocated to the void space in the rock formation (pore space) are represented by a common numerical value, e.g., by only 255s, and all the pixels associated with the rock matrix (or rock grains) are represented by a different numerical value, for example, zeroes. The foregoing process is called image segmentation. Subsequently, the resulting numerical object can be normalized so that the pore spaces are represented by, for example, ones and the rock grains are represented by zeroes. The foregoing may be described as converting the image into a binary index. In other examples, the image may be converted into an index having any selected number, n, of indices. It has been determined that sufficiently accurate modeling of rock properties may be obtained using a binary index, in which one value represents pore space and another single value represents rock grains.

A technique known in the art for segmenting a gray-scale object is called "thresholding", where all pixels having a gray scale value below a selected threshold value (e.g., a gray scale value of 150 on a scale of 0 to 255) are identified as grains, while all other pixels are identified as pore space. The foregoing approach is often not satisfactory, however, because, due to numerical clutter in an unprocessed CT scan image, some pixels physically located inside a grain may have the gray level of the pore space and vice versa. In the invention, a type of image segmentation known as "region growing" can be used. Region growing may be described as follows. Consider a 2D section of a CT scan image made of a porous rock formation such as sandstone, which has primarily quartz rock grains. A substantial number of "seeds" (each seed consists of one or more pixels having a similar pixel gray scale level, e.g., 250±5) is placed within the image. All pixels within a seed are assigned the same gray scale level which may be an average (e.g., arithmetic) of the gray levels of all the pixels within the seed. The seeds in the image frame do not overlap spatially. Next, two or more adjacent seeds are merged and are identified as a "region" if the gray scale levels of the adjacent seeds have gray scale values within a selected difference threshold of each other. Each identified region is assigned a uniform (fixed) gray level, which can be a weighted average of the gray scale values of all the seeds that have been merged into the identified region. The foregoing process continues for all regions thus formed in the image frame. As a result, the unprocessed CT image is transformed into internally uniform regions plus unclassified pixels that were not assigned to any of the identified regions (because such pixels included gray scale values outside the allocation threshold criteria). Each of such unclassified pixels can be assigned to an adjacent region with the closest gray scale level. If the resulting number of regions is greater than two, however, the foregoing method simply fails to allocate the CT image correctly into grains and pores.

To address the foregoing problem with extending ("growing") seeds into regions, in the invention, instead of using seeds having different gray scale values, only two classes of seeds are used: all pixels having a gray scale value below a selected initial limit for the gray scale level of rock grains (e.g., 60) are classified as rock grains; and all pixels in which the gray scale level is larger than a selected initial limit for pore spaces (e.g., 130) are classified as pore space. One simple way of specifying these initial limits is by selecting the gray scale levels corresponding to the peaks of a gray level histogram. In many subsurface formations, such a histogram will be bimodal, wherein one mode value will correspond to the gray scale level of pores, and another mode value will correspond to the gray scale level of rock grains.

The next element in image classification according to the invention is to grow each of the two initially formed seeds by allocating to such seeds all adjacent pixels having gray scale levels within a selected tolerance, e.g., 130−5 for pore spaces and 60+5 for rock grains. The foregoing process can continue by incrementally increasing the gray scale lower limit for rock grains and incrementally reducing the gray scale upper limit for pore spaces until the two limits meet. The result is that all pixels will be allocated to either pore space or to rock grains, thus providing a fully segmented image.

A possible advantage of the foregoing procedure is that instead of forming multiple regions, the foregoing technique grows only two distinctive regions from start to end, thus avoiding the situation where multiple distinctive regions appear and then have to be reclassified into either pores or grains. If the resulting segmented image appears noisy (cluttered), it can be smoothed by any of conventional filters.

A schematic outline of the foregoing procedure follows.

First is to preprocess the original image using the median or 2D Gaussian kernel filter. The size of the filter is provided by the user and should depend on, among other factors, the quality of the image (level of noise). It should be noted that the image segmenting procedure that follows has been demonstrated to be sufficiently noise resistant as to make the preprocessing frequently unnecessary.

Next, two user-selected thresholds, $t_1$ and $t_2$, are selected to determine initial regions for pore space and rock grains, respectively. The initial thresholds may be selected, for example, by analysis of a histogram of the gray scale values in the CT image. For every pixel $p_i$ having a gray scale level represented by $B(p_i)$:

if $B(p_i) > t_1$ then $p_i$ is identified as pore space; and if $B(p_i) < t_2$ then $p_i$ is identified as rock grain.

If there are two or more contiguous pixels in any subset of the image frame that are classified according to the threshold procedure above, such contiguous pixels may be referred to as "clusters." All of the pixels allocated as explained above then become the image seeds from which region growing proceeds.

Finally, for each pixel classified as a pore, its eight neighbors (spatially contiguous pixels) in the 2D image plane are interrogated. If any of the interrogated neighbor pixels is not already identified as pore or rock grain, and the gray scale level of such pixel is within a preselected tolerance level of (or initially selected different between) the gray scale level assigned to the "pore" seed (as in Step 2 above), the interrogated neighbor pixel is then classified as a pore and is allocated to the "pore" cluster.

The foregoing contiguous pixel interrogation is also performed for pixels classified as rock grain. Contiguous, previously unallocated pixels having gray scale level within a preselected tolerance of the gray scale level of the rock grain seed are allocated to the rock grain cluster.

The foregoing cluster allocation and region growing process continues for both pore space and rock grain until all the pixels in the 2D image frame are interrogated. If any of the pixels is not classified as pore space or rock grain, the foregoing tolerance value for each of the pore space and the rock grain may be increased by a selected increment (for example five gray scale numbers), and the contiguous pixel interrogation and classification may be repeated. The foregoing tolerance increase and repeated adjacent pixel interrogation may be repeated until all or substantially all the pixels in the 2D image frame are allocated to either rock grain or pore space.

The foregoing region growing procedure is then repeated for each 2D image frame in the 3D CT scan image. The result is a three dimensional characterization of the pore structure of the rock samples on which CT imaging has been performed.

Figure 2:
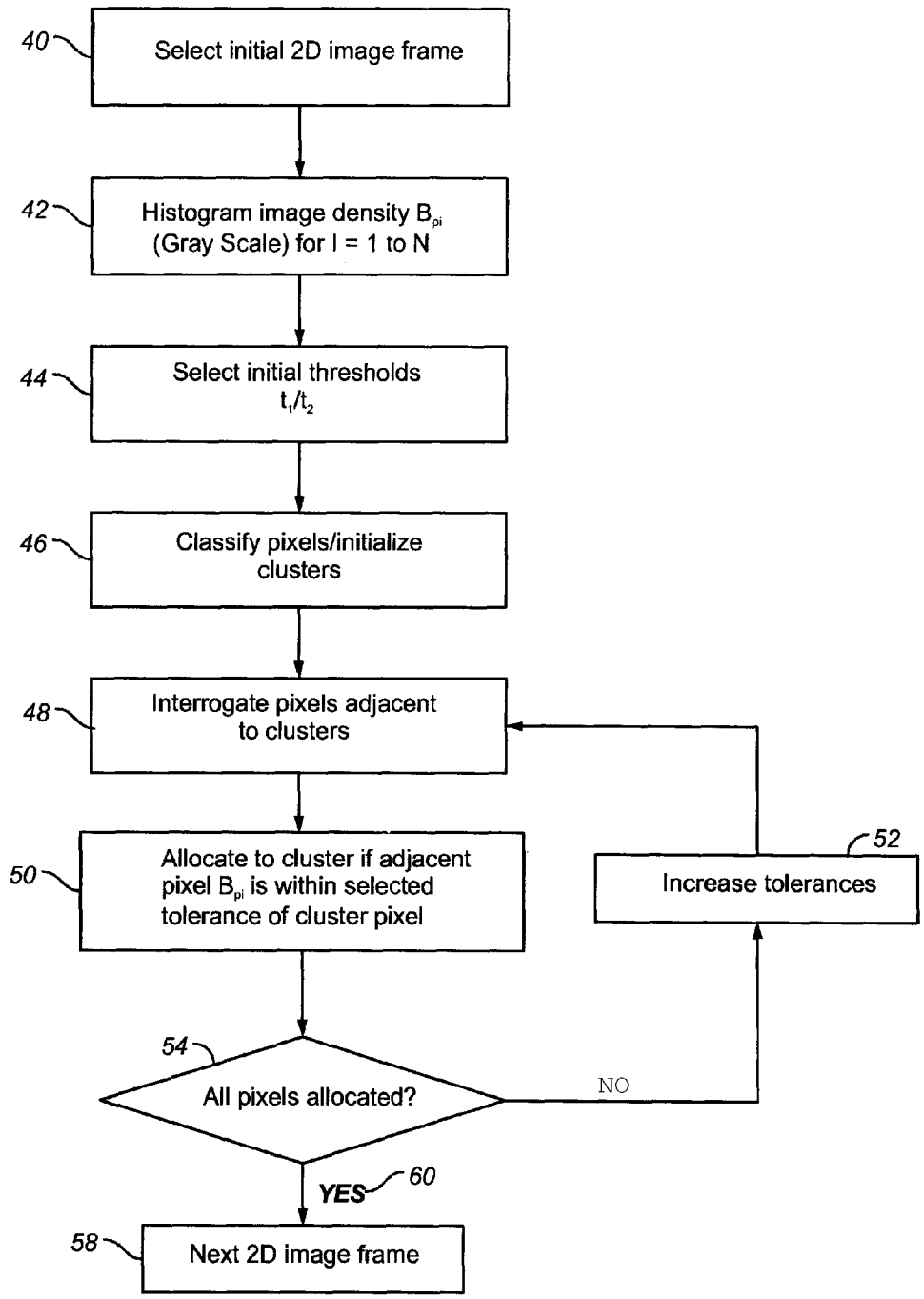
FIG. 2 shows a flow chart of an example process for CT image segmentation.

An example implementation of the above process for image segmentation is shown in a flow chart in FIG. 2. At 40, a 2D image frame of a CT scan image is selected. The image frame may be subjected to histogram analysis, at 42 to determine possible mode values of gray scale for pore spaces and for rock grains. At 44, the possible modes of the histogram may be used to set initial values for the image segmentation thresholds $t_1$ and $t_2$. At 46, using the initial segmentation thresholds, all pixels in the image frame are interrogated may be are allocated to pore space or to rock grains, depending on whether the gray scale value in each pixel exceeds the respective segmentation threshold. The allocated pixels are then segmented into seeds where two or more contiguous pixels are allocated to either pore space or rock grain. At 48, pixels adjacent to the each of the seeds are interrogated. Previously unallocated pixels having a gray scale value falling within an initially selected threshold difference (or tolerance) of the adjacent cluster pixel gray scale value are allocated to the seed at 50. At 54, the image frame is interrogated to determine if all or substantially all the image frame pixels have been allocated to either pore space or rock grain. At 54, the number of allocated pixels is counted and at 60 if all or substantially all the pixels in the image frame have been allocated, a new 2D image frame can be selected, at 58, and the above process repeated. Typically the next 2D image frame will be adjacent to the most recently analyzed 2D image frame. The above process can be repeated until all available 2D image frames have been analyzed. If all pixels in the image frame have not been allocated, at 52, the tolerance or difference threshold values used at 50 may be increased and the interrogation of pixels adjacent to the existing seeds can be repeated, at 48, and the remainder of the process can be repeated.

The result of the foregoing procedure is a segmented 3D image of the rock sample including image elements for rock grain and for pore space. Such image can be stored or displayed in a computer and can be used as input to one or more rock property characterization models.

3D tomographic images of a rock sample are usually obtained at surface conditions (e.g., 1 atmosphere pressure and 25 degrees C ambient temperature). For formations with high mechanical strength, the physical properties (especially the transport properties, such as permeability and resistivity) of rock samples from these formations may not vary substantially between surface conditions and in-situ (e.g., in the subsurface or reservoir) conditions. However, the physical properties of the rock sample may vary substantially between surface conditions and in-situ conditions for other formation types, such as (a) unconsolidated oil sands, where some pore space portions appearing at room conditions may be artifacts of the pore fluid expansion, and (b) tight sandstone and drill cuttings, where some of the fracturing appearing at room conditions may be an artifact of cracking due to stress release, drying, and handling.

Figure 3:
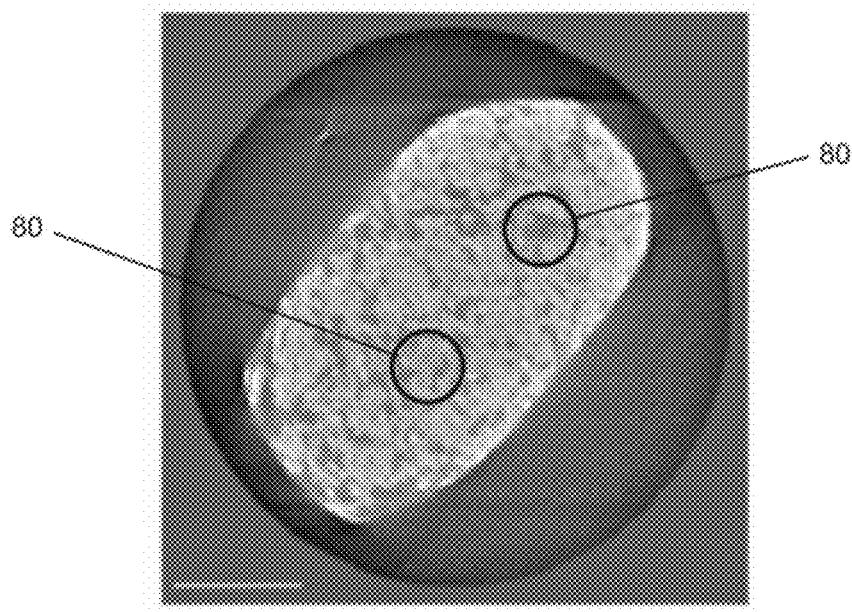
FIG. 3 is an image of a sample of heavy oil sand.
Figure 4:
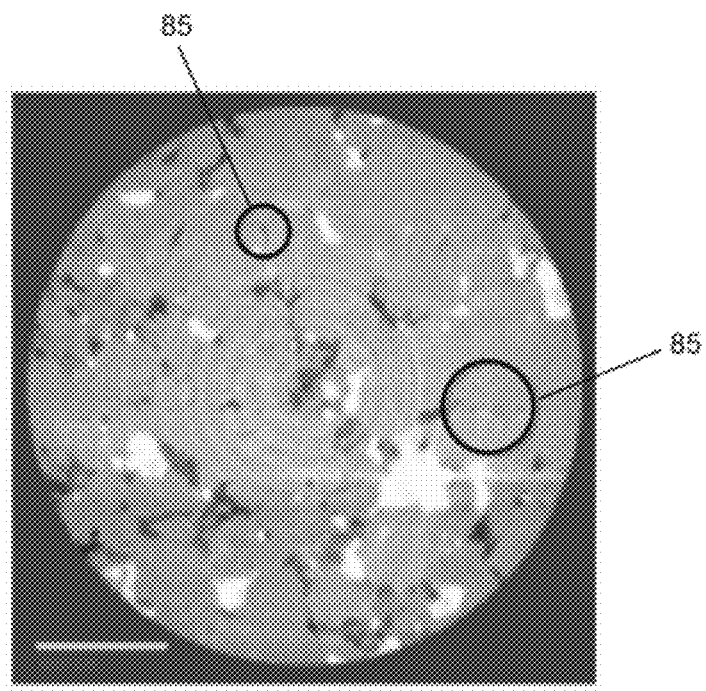
FIG. 4 is an image of a sample of tight gas sand.
Figure 5:
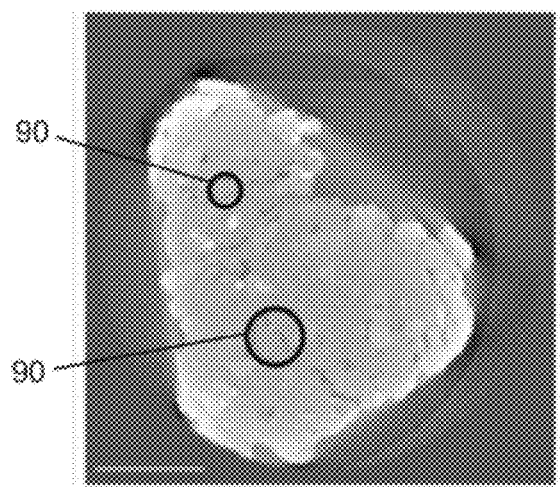
FIG. 5 is an image of a sample of drill cutting.

For illustration purposes, images of rock samples at surface conditions are shown in FIGS. 3-5. In FIG. 3, an image of an unconsolidated oil sand is shown. In the image of FIG. 3, the rock grains are relatively light, while the pores are relatively dark. Domains, highlighted by circles 80, with unnaturally large spaces between the grains can be observed in the image. The unnaturally large spaces may have been generated by oil expansion as external pressure was reduced as the sample was transported from in-situ to surface conditions. In FIG. 4, an image of a "tight" (low permeability) gas-bearing sandstone is shown. In the image of FIG. 4, thin cracks, which are highlighted by circles 85, can be observed. These thin cracks may have been generated due to stress release as the sample was transported from in-situ to surface conditions. In FIG. 5, an image is shown of a drill cutting which has been altered while it traveled in the mud and then was collected and dried. In the image of FIG. 5, thin cracks, highlighted by circles 90, can be observed. These thin cracks appear to be due to handling, including drying, of the drill cutting.

The invention includes a method of determining relationships between physical properties of a porous medium, e.g., rock sample, existing at in-situ conditions from a 3D image of the porous medium obtained at conditions other than in-situ conditions, e.g., surface conditions. The method uses sub-sampling and/or artifact healing of the 3D image to minimize or reduce the effects of artifacts on the properties of the porous medium where the artifacts are due to change in environmental conditions affecting the porous medium, e.g., movement from in-situ conditions to surface conditions.

Figure 6:
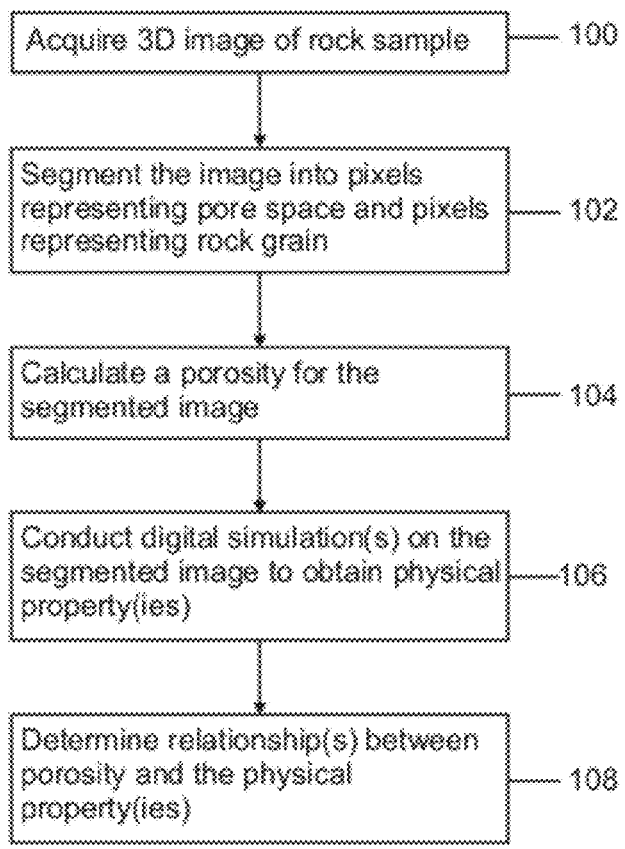
FIG. 6 is a flowchart of a process for determining in-situ rock physics relationships.

FIG. 6 is a flow chart of an example process for determining in-situ relationship between one or more physical properties of a rock sample and porosity in accordance with one embodiment of the invention. At the beginning of the process, a high-resolution 3D image of a rock sample is acquired at 100. The rock sample may be, for example, a small fragment or fragments of a formation from core, sidewall plug, or a drill cutting. This step may include obtaining the rock sample through any appropriate means, such as by drilling or coring. The high-resolution 3D image may be a 3D tomographic image generated by CT-scanning. As an example, the CT scanner (30 in FIG. 1) may be used. The 3D image can be stored on a suitable media, which may be associated with, for example, a computer (32 in FIG. 1). The 3D image may be rendered as pixels on a screen. The 3D image acquired at 100 serves as a computer model for the rock sample and can be used for various computation tasks. As shown in FIG. 6, the image is segmented into image portions (i.e., pixels) representing pore space and image portions (i.e., pixels) representing rock grain or mineral matrix at 102. An image segmentation technique such as described with reference to FIG. 2 may be used. From the segmented image, porosity is calculated at 104. In the present example, the porosity of the segmented image is obtained by dividing the number of pixels allocated to the pore space by the total number of pixels in the segmented image.

Next, a simulation (e.g., a numerical simulation) of a physical experiment is conducted on the segmented image to obtain one or more physical properties of the rock sample at 106. One of the inputs to the simulation may be the porosity calculated at 104. Different digital simulations may be conducted to obtain different physical properties of the rock sample. As an example, digital simulations of physical experiments that may be conducted include one or more of the following: (a) single-phase fluid flow using the Lattice-Boltzmann numerical method (LBM) to obtain the absolute permeability of the rock sample, (b) elastic deformation using the finite-element method (FEM) to obtain the elastic moduli and elastic-wave velocity of the rock sample, and (c) electrical current flow using FEM to obtain the electrical resistivity and formation factor of the rock sample. Other digital simulations besides those listed above may also be conducted depending on the desired physical properties of the rock sample. In one example, permeability modeled with the porosity determined at 106 is determined. Formation factor and elastic moduli are also determined. Shear modulus and bulk modulus may also be determined. In the present invention, numerical simulations are conducted on a "real" 3D pore space as opposed to a synthetic model of the pore space. Any or all of the foregoing estimated physical properties and porosity may be stored and/or displayed in the computer (32 in FIG. 1) for later use.

With reference to 106 in FIG. 6, it was stated that Lattice-Boltzmann method (LBM) can be used to determine permeability. In the present example, the Lattice-Boltzmann method (LBM) mathematically mimics the Navier-Stokes equations of viscous flow and enables simulation of the viscous flow required for permeability estimates in real pore space. LBM is a robust tool for flow simulation, particularly in media with complex pore geometry. See, for example. Ladd, *Numerical Simulations of Particulate Suspensions via a discretized Boltzmann Equation, Part* 1: *Theoretical Foundation*, J. Fluid Mech., v271, 1994, pp. 285-309; Gunstensen et al., "*Lattice Boltzmann Model of Immiscible Fluids*, Phys. Rev. A., v.43, no. 8, Apr. 15, 1991, pp. 4320-4327; Olsen et al., *Two-fluid Flow in Sedimentary Rock: Simulation, Transport and Complexity*, J. Fluid Mechanics, Vol. 341, 1997, pp. 343-370; and Gustensen et al., *Lattice-Boltzmann Studies of Immiscible Two-Phase Flow Through Porous Media,*" *J. of Geophysical Research*, V. 98, No. B4, Apr. 10, 1993, pp. 6431-6441).

The Lattice-Boltzmann method simulates fluid motion as collisions of imaginary particles, which are much larger than actual fluid molecules, but wherein such particles show almost the same behavior at a macroscopic scale. The algorithm used in the Lattice-Boltzmann method repeats collisions of these imaginary particles until steady state is reached, and provides a distribution of local mass flux. In accordance with the present invention, the Lattice-Boltzmann method is applied successfully for many pore structures, including cylindrical tubes, random densely packed spheres, and 3D rock samples digitized by CT scanning as explained above. See, for example, U.S. Pat. No. 6,516,080 issued to Nur. Other methods of determining physical properties of rock samples, such as described in, for example, U.S. Pat. No. 7,277,795 issued to Boitnott, may also be used.

Figure 7:
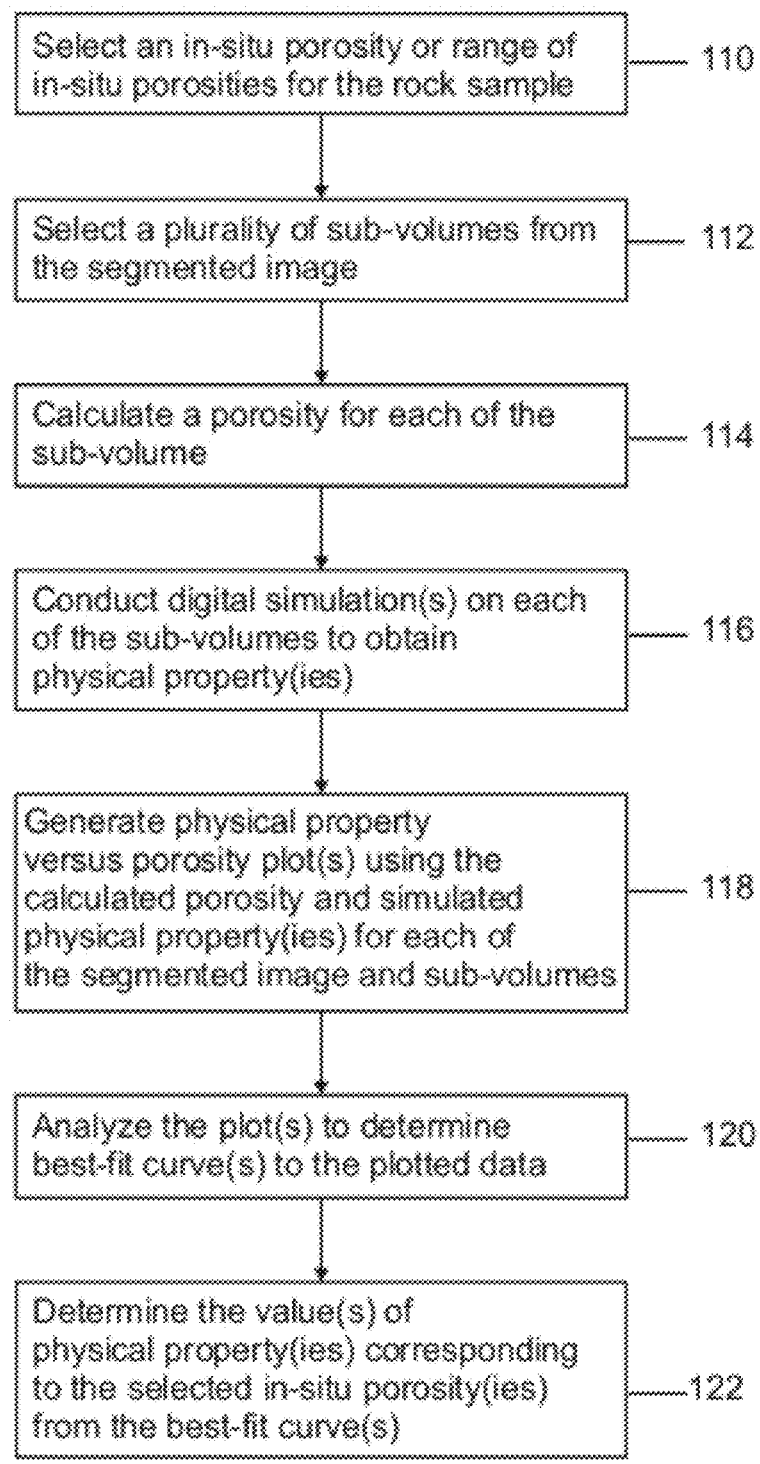
FIG. 7 is a flowchart depicting a procedure for determining in-situ rock physics relationships by subsampling.

The final step in the process includes determining relationships between porosity and other physical properties of the rock sample at 108. There are two approaches to determining these relationships, as detailed in FIGS. 7 and 10 respectively. Referring to FIG. 7, one example starts with selection of an in-situ porosity (target in-situ porosity) or range of in-situ porosities (range of target in-situ porosities) for the rock sample at 110. Selection of the target in-situ porosity or range of target in-situ porosities can be accomplished in a variety of ways. In one example, the target in-situ porosity is calculated by reducing the surface-condition porosity calculated at 104 of FIG. 6 according to the oil expansion factor. For example, if the surface-condition porosity is 0.30 and the oil expansion factor from in-situ to room conditions is 1.1, then the target in-situ porosity would be 0.30/1.1=0.27. In another example, the target in-situ porosity is obtained from direct measurements of a formation under examination in the well or in the physical laboratory. In yet another embodiment, a range of possible in-situ porosities and the corresponding range of rock properties are provided from known sources. In another example, the target in-situ porosity is simply assumed.

Figure 8:
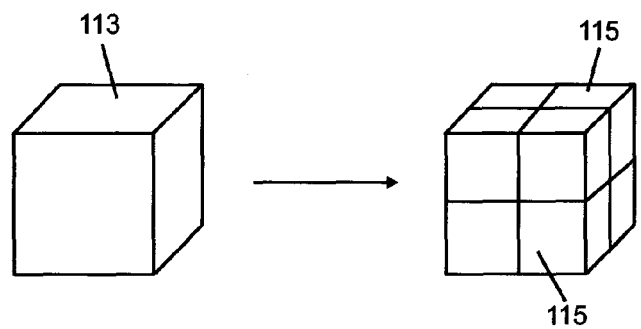
FIG. 8 illustrates subdividing of a segmented image into sub-volumes.

Still referring to FIG. 7, a plurality of sub-volumes are next selected from the segmented image at 112. The sub-volumes, like the segmented image, are also 3D images having pixels allocated to pore space and pixels allocated to mineral matrix or rock grain. Each sub-volume represents a subsample of the original rock sample. The process element at 112 may include evenly subdividing the segmented image into sub-volumes. Consider, for example, FIG. 8, where a segmented image 113 is modeled as a cube. The cube 113 may be evenly subdivided into sub-cubes 115, as desired in step 112 of FIG. 7. In general, the segmented image 113 may be subdivided into as many sub-volumes as desired, e.g., 8, 27, 64, or 125 sub-volumes. Alternatively, at 112 in FIG. 7 may involve randomly selecting sub-volumes from the segmented image. In this case, overlaps between sub-volumes may be allowed. Returning to FIG. 7, porosity is calculated for each of the sub-volumes at 114. Porosity of each sub-volume can be expressed as the number of pixels in the sub-volume corresponding to pore space divided by the total number of pixels in the sub-volume.

Still referring to FIG. 7, for each sub-volume (subsample), simulations of physical experiments are conducted to obtain one or more physical properties for the sub-volumes at 116. The digital simulations are as described previously with respect to FIG. 6 and will not be repeated here again. The simulations for each sub-volume may receive the selected in-situ porosity or range in-situ porosities as at 110 as input rather than the surface-condition porosity determined at 104 in FIG. 6. In one example, permeability modeled with in-situ porosity is determined by digital simulation. One or more of formation factor, elastic moduli, shear modulus, and bulk moduli may also be determined by such simulation(s). Any or all of the foregoing physical properties obtained from such simulations and calculated porosities may be stored and/or displayed in the computer (e.g., 32 in FIG. 1) for later use.

The estimated physical properties of the subsamples obtained at step 116 more closely approximate in-situ conditions because the global effects of artifacts such as unnaturally large pore space are reduced or minimized at the local level of the subsamples. At this point in the process illustrated in FIG. 7, a set of porosities for the subsamples calculated at 114 is known. At least one corresponding set of physical property, e.g., permeability, calculated at 116 is also known. Additional corresponding sets of physical properties, e.g., formation factor and elastic moduli, calculated in step 116 may also be known. The next element in the process is to generate a physical property versus porosity plot using the known data sets as shown at 118. As an example, a permeability versus porosity plot may be generated using data calculated at 114 and 116. For comparison purposes or completeness, this plot may also include permeability from 108 of FIG. 6 and porosity from 104 of FIG. 6. Similar plots can be made for all the other physical properties, e.g., formation factor and elastic moduli, computed at 114, 116 in FIG. 7 and 104, 108 in FIG. 6.

Figure 9:
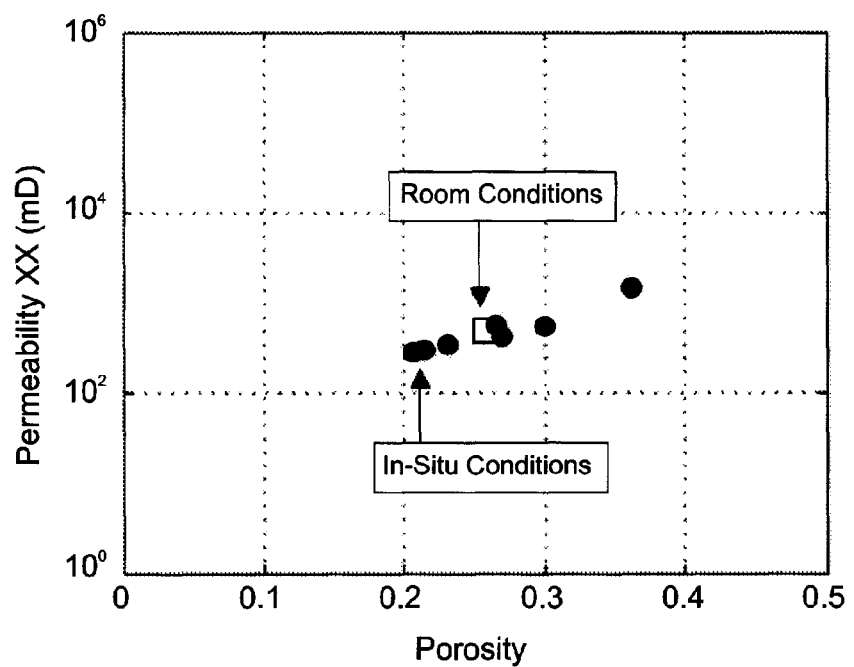
FIG. 9 is a sample permeability versus porosity plot depicting data points at in-situ conditions obtained by subsampling.

Each plot generated at 118 of FIG. 7 provides a relationship between a physical property and porosity. FIG. 9 shows an example of a permeability versus porosity plot. The square data point indicates the permeability-porosity data point computed using the segmented image, as in FIG. 6. The circle data points indicate the permeability-porosity data points computed using the subsamples, as in FIG. 7. The relationship between a physical property and porosity may be expressed as a function in addition to providing it as a plot. Returning to FIG. 7, at 120 the plotted data are analyzed to determine a best-fit curve to the plotted data. Any suitable technique, such as least squares regression, may be used to determine the best-fit curve. Such determination may include a specification of the range of porosities for which the curve is valid. The surface-condition data (determined in FIG. 6) may or may not be included in the analysis to determine the best-fit curve. From the best-fit curve, the value of a physical property corresponding to the in-situ porosity or range of in-situ porosities selected at 110 in FIG. 6 may be easily determined, as shown at 122. It is also possible to determine values of physical properties corresponding to in-situ porosity or range of in-situ porosities by visual inspection of the plots made at 120.

Figure 10:
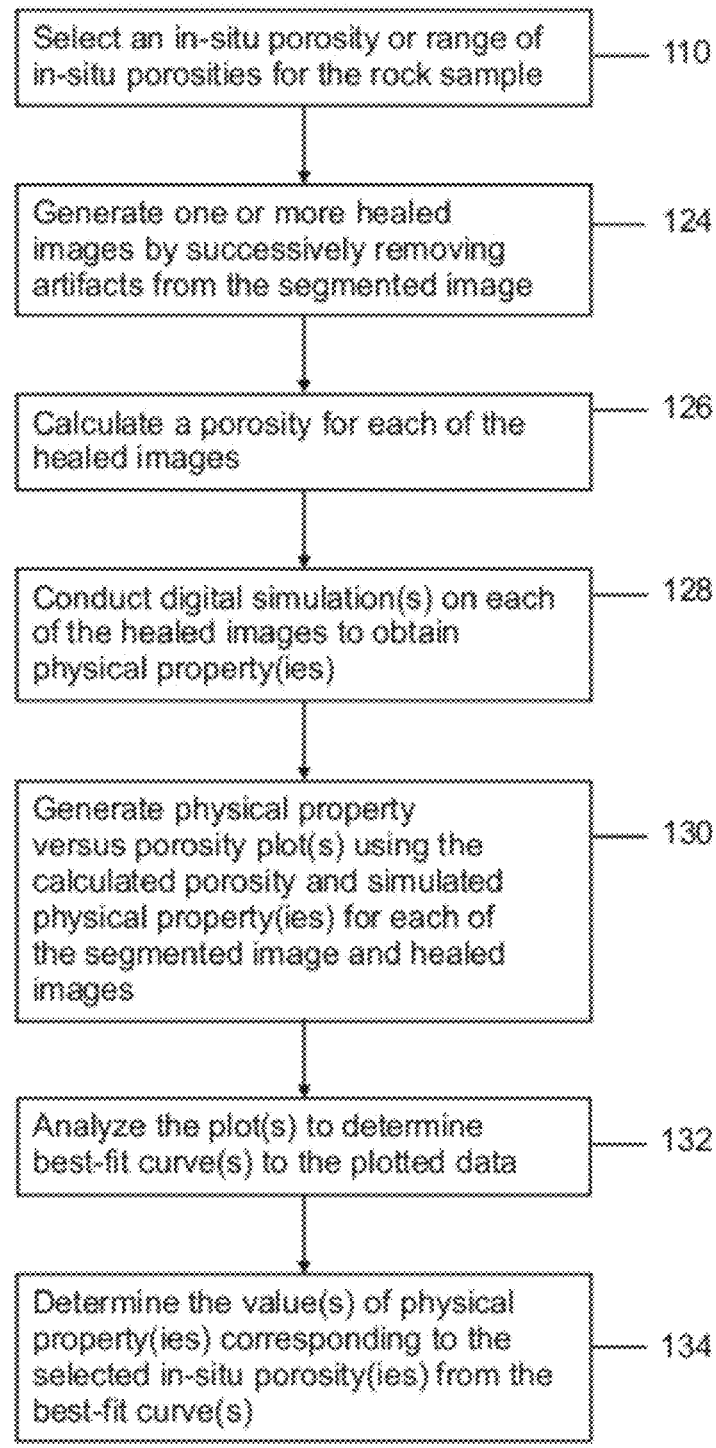
FIG. 10 is a flowchart depicting a procedure for determining in-situ rock physics relationships by artifact healing.

Another example process determining in-situ relationships between physical properties of the rock sample at in-situ conditions is detailed in FIG. 10. The present example approach also starts by selection of an in-situ porosity (target in-situ porosity) or range of in-situ porosities (range of target in-situ porosities) for the rock sample (e.g., at 110). Element 110 has been described above with reference to FIG. 7. In FIG. 10, the next element of the procedure is to generate one or more healed images by selectively removing artifacts from the segmented image obtained at 102 of FIG. 6 (i.e., at 124). A procedure for healing the segmented image will be described later. In FIG. 10, for each healed image, a porosity is calculated at 126. This is similar to calculating porosity for a segmented image or sub-volume, as previously described. Next, simulations of physical experiments are conducted to obtain one or more physical properties for the healed images at 128. The foregoing is similar to 108 in FIG. 6 and 116 in FIG. 7, except that it is conducted on healed images rather than the original segmented image (FIG. 6) or sub-volumes (FIG. 7) thereof. Any description related to 108 in FIG. 6 and 116 in FIG. 7 also applies to 128 in FIG. 10. At 128, physical properties such as permeability, formation factor, and elastic moduli can be determined by simulations such as numerical simulations.

Figure 11:
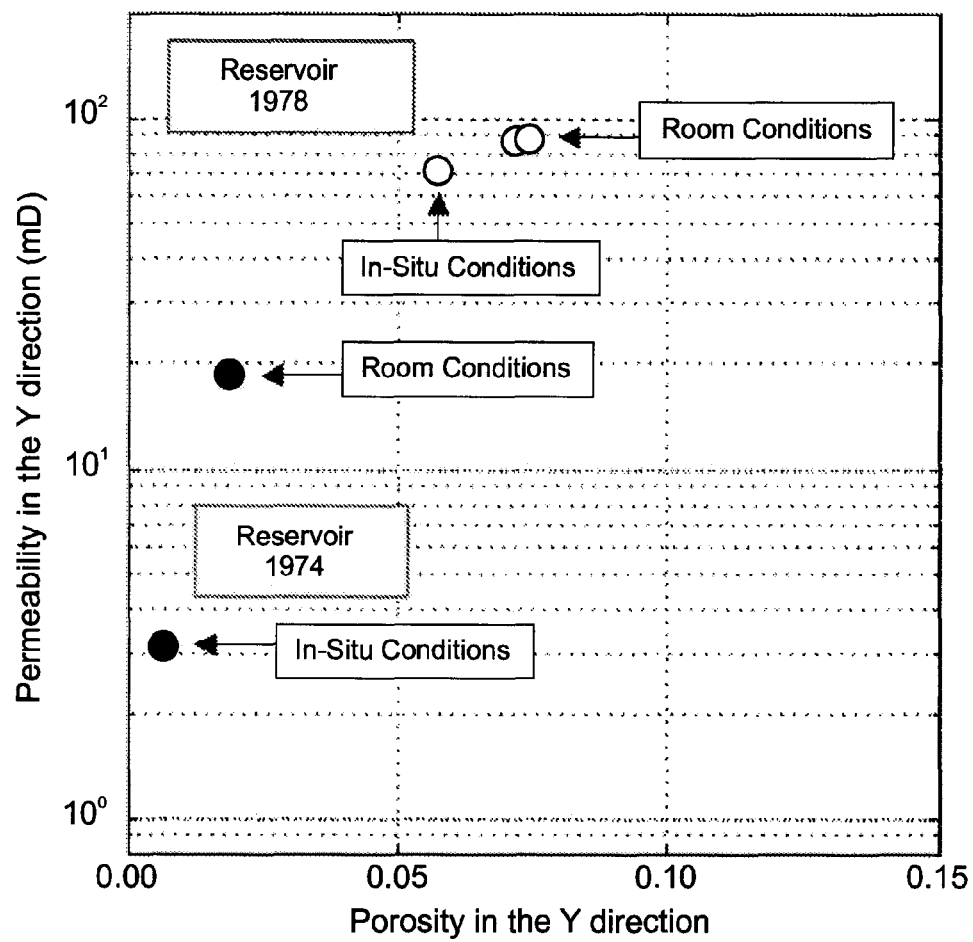
FIG. 11 is a sample permeability versus porosity plot depicting data points at in-situ conditions obtained by artifact healing.

The data sets acquired at 128 and the porosities acquired at 126 are used to create one or more physical property versus porosity plots at 130. Again, the foregoing is similar to 120 in FIG. 7 except that it applies to healed images instead of sub-volumes (or subsamples). In the interest of conciseness, procedures already explained adequately with respect to FIG. 7 will not be repeated here. At 130, examples of plots that may be produced include, but are not limited to, permeability versus porosity plot, formation factor versus porosity plot, and elastic moduli versus porosity plot. The plots include data computed at 128 and 126 in FIG. 10 and may include data computed at 104 and 106 in FIG. 6. The plots can be analyzed as previously explained to obtain best-fit curves at 132. Each of the best-fit curves may be used to determine a physical property that corresponds to a selected in-situ porosity at 134. FIG. 11 shows an example permeability versus porosity plot obtained by healing cracks in two digital samples. In the plot of FIG. 11, surface conditions indicate the data points computed according to 104, 106 in FIG. 6, and in-situ conditions indicate the data points computed according to 126, 128 in FIG. 10.

Figure 12A:
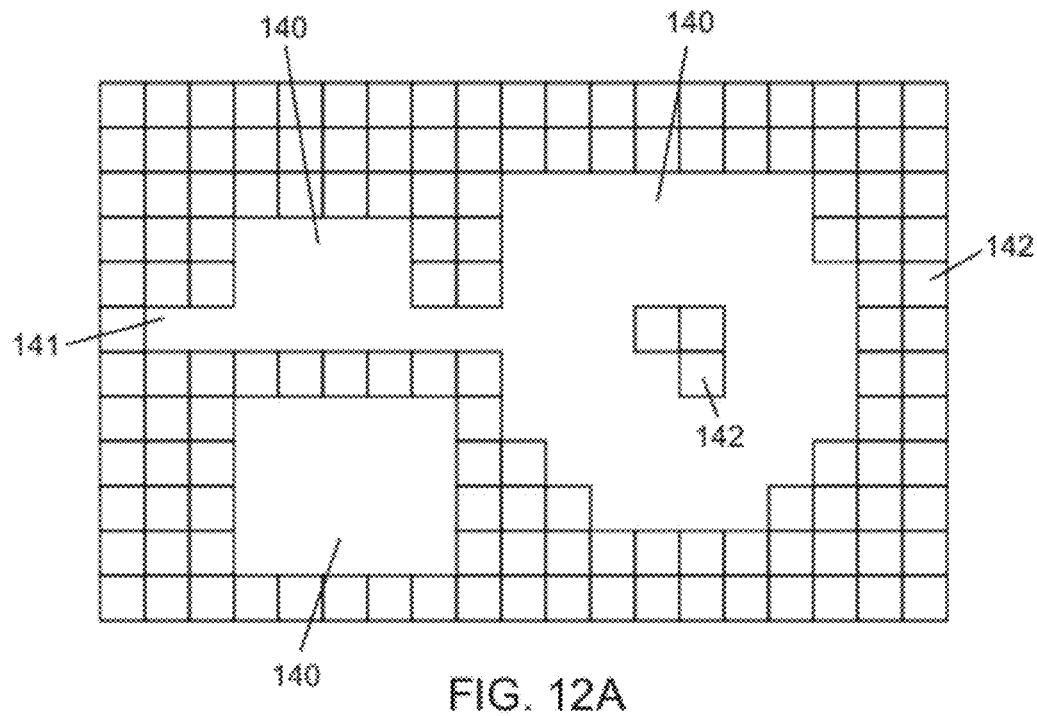
FIGS. 12A-12D illustrate a procedure for healing a segmented image.
Figure 12B:
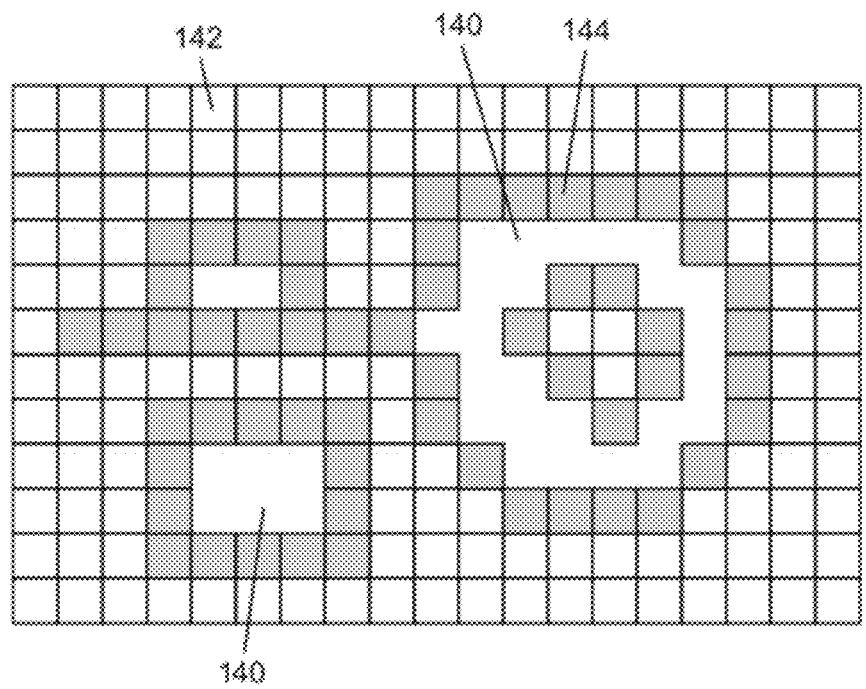
Figure 12C:
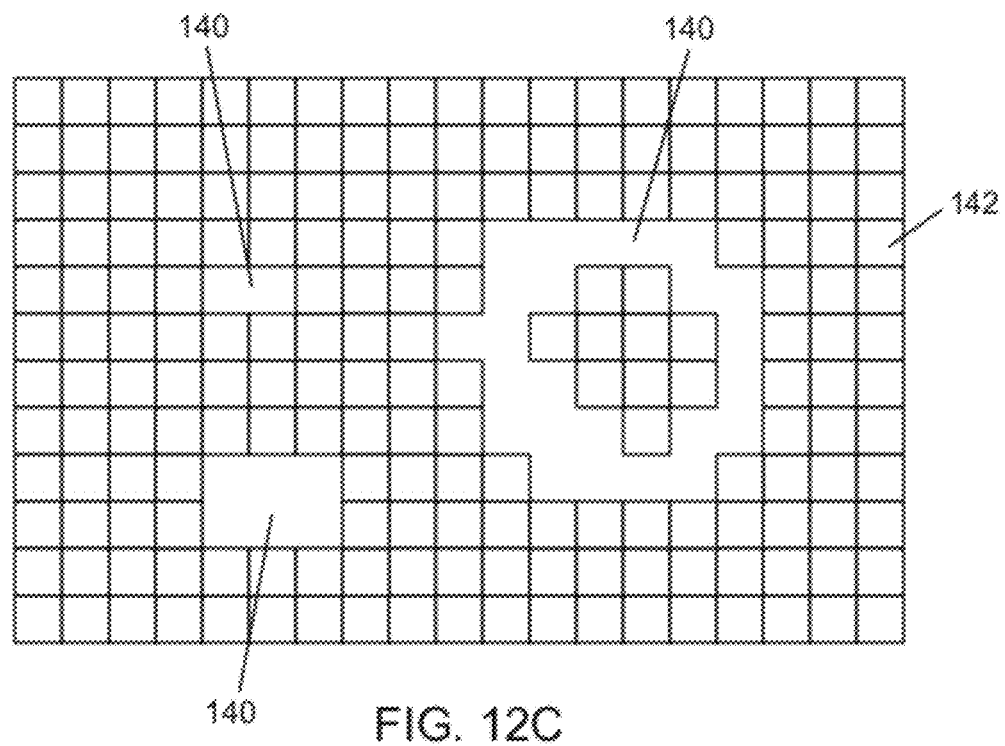
Figure 12D:
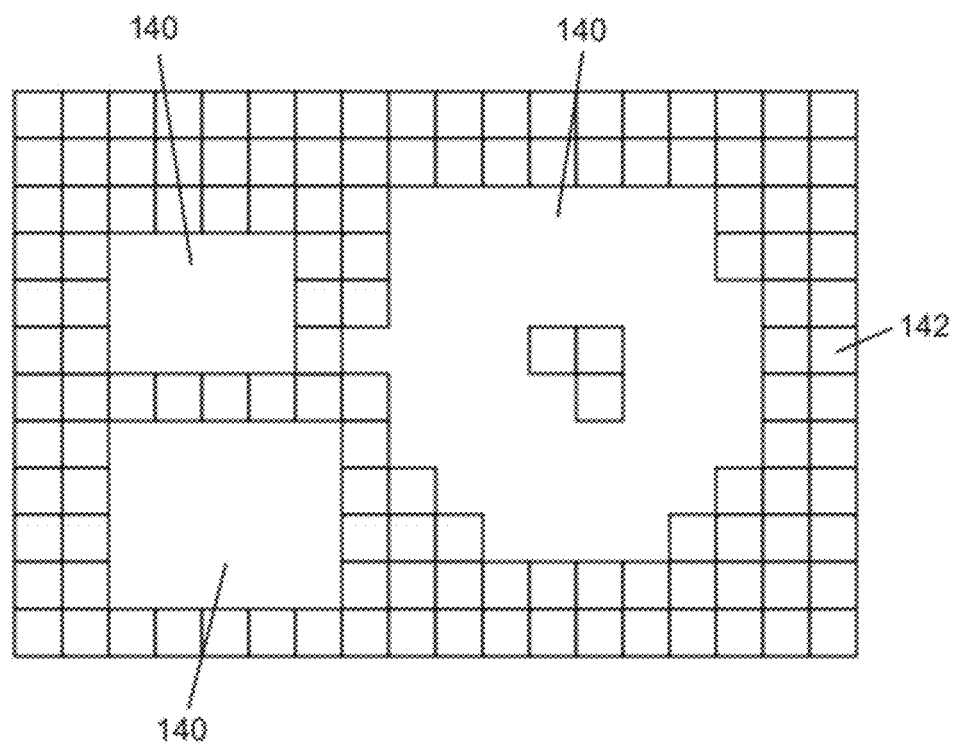

A procedure for healing images for use, e.g., at 124 in FIG. 10 will now be described with reference to FIGS. 12A-12D. FIG. 12A graphically depicts a segmented image including pore space 140 and rock grain or mineral matrix 142. The segmented image is healed by adding layers of pixels, starting with one pixel, to the solid part (rock grain) of the image, along the entire internal surface of the pore space. This is illustrated in FIG. 12B, where the shaded pixels 144 represent the added layer of pixels. In FIG. 12C, the shadings have been removed to illustrate that the pixels (144 in FIG. 12B) have become part of the solid part (rock grain) of the image. Note that the pore space 140 is now smaller than the original size in FIG. 12A. Also, note that the thin portions of the pore space, indicated at 141 in FIG. 12A, no longer exists in FIG. 12C. Thus, adding layers of pixels to the solid part of the image has the effect of closing thin portions of the pore space and, simultaneously, reducing the size of larger pores. The next step is to take the numerical object thus rendered and uniformly subtract a number of pixels from the solid part along the internal surface of the pore space. The end result of such a procedure is illustrated in FIG. 12D. As shown in FIG. 12D, the foregoing action does not reopen the healed thin pore space but restores the larger pores 140 to their original size. Each pass of addition and subtraction of pixels creates a healed image with additional artifacts removed. This procedure allows removal of thin cracks, which may have been the result of damage to the rock sample from the drill bit, inelastic stress release and drying.

In other embodiments of the invention, subsampling as described in FIG. 7 and artifact healing as described in FIG. 10 may be combined to determine in-situ rock physics relationships. For example, it is possible to first heal the image, as described at 124 in FIG. 10, and then use the healed image as the segmented image for the subsampling procedure described in FIG. 7.

Methods according to the various aspects of the invention may provide more precise estimates of fluid transport properties and other above-mentioned properties of subsurface rock formations obtained using rock samples analyzed at surface conditions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining in-situ rock physics relationships of a porous medium from a sample thereof, comprising:
   generating, using a scanner, a three-dimensional image of the sample, wherein said sample has thin cracks which result in creating artifacts in the three-dimensional image;
   segmenting the image into pixels representing pore space and pixels representing rock grain;
   producing one or more healed images from the segmented image by selectively removing artifacts from the segmented image;
   calculating a porosity for each of the healed images;

conducting a digital simulation on each of the healed images to obtain a selected physical property for the healed image;

determining a relationship between porosity and the selected physical property using the estimated porosity and simulated physical property for each of the healed images; and at least one of storing and displaying the relationship.

2. The method of claim 1, further comprising calculating a porosity for the segmented image.

3. The method of claim 2, further comprising conducting a digital simulation on the segmented image to obtain a physical property for the segmented image.

4. The method of claim 3, wherein the relationship data for determining the relationship between porosity and the physical property further comprises the calculated porosity and simulated physical property for the segmented image.

5. The method of claim 1, wherein generating the three dimensional image of the sample comprises computer tomographic scanning the sample.

6. The method of claim 1, wherein the segmented image comprises a value of gray scale allocated to each of a plurality of the pixels in the image.

7. The method of claim 6, wherein the segmenting comprises:

(a) determining an initial gray scale threshold for each of pore space and rock grain;

(b) allocating each pixel in the image to a pore space seed or a rock grain seed for each pixel meeting threshold criteria for each of the initial gray scale threshold for each of said pore space and rock grain, respectively;

(c) interrogating pixels adjacent to each of said pore space seed or rock grain seed to obtain interrogated adjacent pixel for each of said pore space or rock grain seed;

(d) allocating each of the interrogated adjacent pixel, if previously not allocated, to the pore space seed or the rock grain seed based on threshold criteria; and (e) repeating (c) and (d) until substantially all pixels in the image are allocated to the rock grain seed or the pore space seed.

8. The method of claim 7, wherein determining initial gray threshold comprises histogram analysis of the image of the sample.

9. The method of claim 7, wherein the allocating the interrogated adjacent pixel comprises determining a difference between a gray scale value of each of said pore space seed or rock grain seed and a gray scale value of the interrogated adjacent pixel to the rock grain seed or the pore space seed, and allocating the interrogated adjacent pixel to the rock grain seed or the pore space seed if the difference falls below a selected difference threshold.

10. The method of claim 9, further comprising:
determining whether unallocated pixels exist in the image;
increasing the selected difference threshold; and
repeating the interrogating of pixels adjacent and allocating each interrogated adjacent pixel
having gray scale values wherein the difference is below the increased difference threshold.

11. The method of claim 1, further comprising selecting a plurality of sub-volumes from the segmented image that comprises subdividing the segmented image evenly or randomly into sub-volumes.

12. The method of claim 11, further comprising removing artifacts from the segmented image prior to selecting a plurality of sub-volumes from the segmented image.

13. The method of claim 1, wherein the physical property comprises permeability.

14. The method of claim 13, wherein permeability is estimated using the Lattice-Boltzmann approximation.

15. The method of claim 1, wherein the physical property comprises formation factor.

16. The method of claim 1, wherein the physical property comprises elastic moduli.

17. The method of claim 1, wherein determining the relationship between porosity and physical property comprises determining a best-fit curve to the relationship data.

18. The method of claim 1, wherein producing one or more healed images comprises adding pixels to the segmented image uniformly along the internal surface of the pore space and subsequently subtracting pixels from the segmented image along the internal surface of the pore space.

* * * * *